(12) United States Patent
Phillip et al.

(10) Patent No.: US 10,009,479 B2
(45) Date of Patent: *Jun. 26, 2018

(54) PORTABLE DATA FOR MOBILE DEVICES

(71) Applicant: Verizon Patent and Licensing Inc., Arlington, VA (US)

(72) Inventors: Che D. Phillip, Asbury, NJ (US); Praveen Atreya, Jersey City, NJ (US); Mervin G. Johnson, Somerset, NJ (US); Manian Krishnamoorthy, Hyannis, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/375,500

(22) Filed: Dec. 12, 2016

(65) Prior Publication Data
US 2017/0118352 A1      Apr. 27, 2017

Related U.S. Application Data

(63) Continuation of application No. 14/918,936, filed on Oct. 21, 2015, now Pat. No. 9,560,214.

(51) Int. Cl.
| | |
|---|---|
| *H04M 11/00* | (2006.01) |
| *H04W 4/00* | (2018.01) |
| *H04M 15/00* | (2006.01) |
| *H04W 4/24* | (2018.01) |
| *H04M 15/02* | (2006.01) |

(52) U.S. Cl.
CPC .......... *H04M 15/60* (2013.01); *H04M 15/80* (2013.01); *H04M 15/888* (2013.01); *H04W 4/24* (2013.01)

(58) Field of Classification Search
CPC .... H04M 15/60; H04M 15/80; H04M 15/888; H04W 4/24
USPC ........................................... 455/406
See application file for complete search history.

(56) References Cited

U.S. PATENT DOCUMENTS

| | | | |
|---|---|---|---|
| 9,560,214 B1* | 1/2017 | Phillip | ................ H04M 15/705 |
| 2003/0005135 A1* | 1/2003 | Inoue | ...................... G06F 21/10 |
| | | | 709/229 |
| 2003/0147363 A1 | 8/2003 | Ala-Luukko | |
| 2005/0176421 A1 | 8/2005 | Matenge et al. | |

(Continued)

*Primary Examiner* — Rafael Pérez-Gutiérrez
*Assistant Examiner* — Mark G. Pannell

(57) ABSTRACT

Network devices receive configuration settings for a portable data account with a service provider. The portable data account provides for mobile data over a broadband cellular network. The network devices receive, via a mobile device, user credentials, for a user, to activate a portable data service for the mobile device. The network devices determine that the user credentials correspond to the portable data account, the portable data account being different than a default account associated with the mobile device. The network devices map a temporary mobile directory number (MDN), which is associated with the portable data account, to a unique identifier for the mobile device, and enforce the configuration settings for a portable data session, associated with the temporary MDN, for the portable data account. The network devices log mobile data, used by the mobile device, for the portable data session and create a billing record for the portable data session, the billing record being based on the logging and associated with the portable data account.

20 Claims, 11 Drawing Sheets

(56) References Cited

U.S. PATENT DOCUMENTS

| | | | |
|---|---|---|---|
| 2009/0149175 A1* | 6/2009 | Lopresti | H04W 8/265 455/433 |
| 2010/0009659 A1* | 1/2010 | Netanel | H04L 63/06 455/411 |
| 2010/0069095 A1* | 3/2010 | Yahav | H04L 51/066 455/466 |
| 2010/0273462 A1* | 10/2010 | Thorn | H04W 8/26 455/414.1 |
| 2010/0316206 A1 | 12/2010 | Chang et al. | |
| 2012/0060198 A1* | 3/2012 | Tremblay | H04L 12/1407 726/1 |
| 2012/0322410 A1 | 12/2012 | Lodeweyckk | |
| 2013/0223362 A1* | 8/2013 | Alfano | H04W 72/04 370/329 |
| 2014/0274008 A1 | 9/2014 | Olodort | |
| 2014/0335823 A1* | 11/2014 | Heredia | H04L 51/38 455/411 |

\* cited by examiner

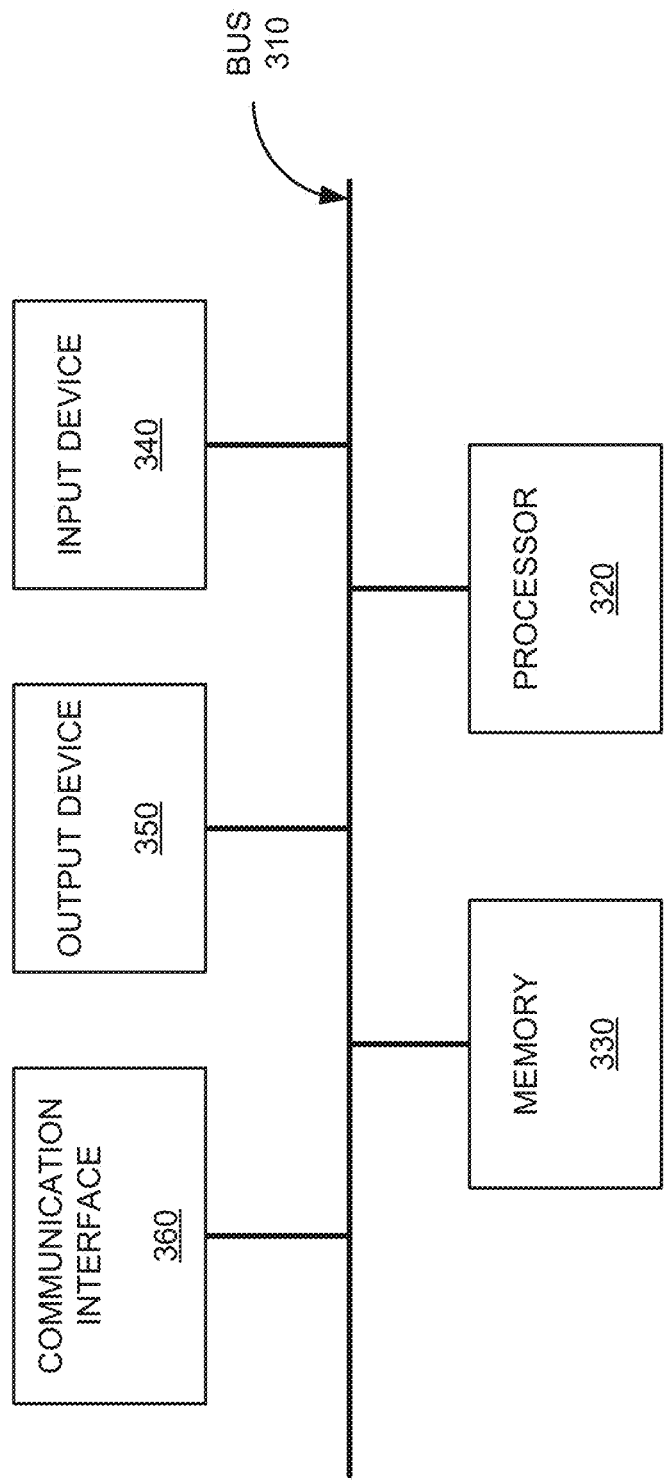

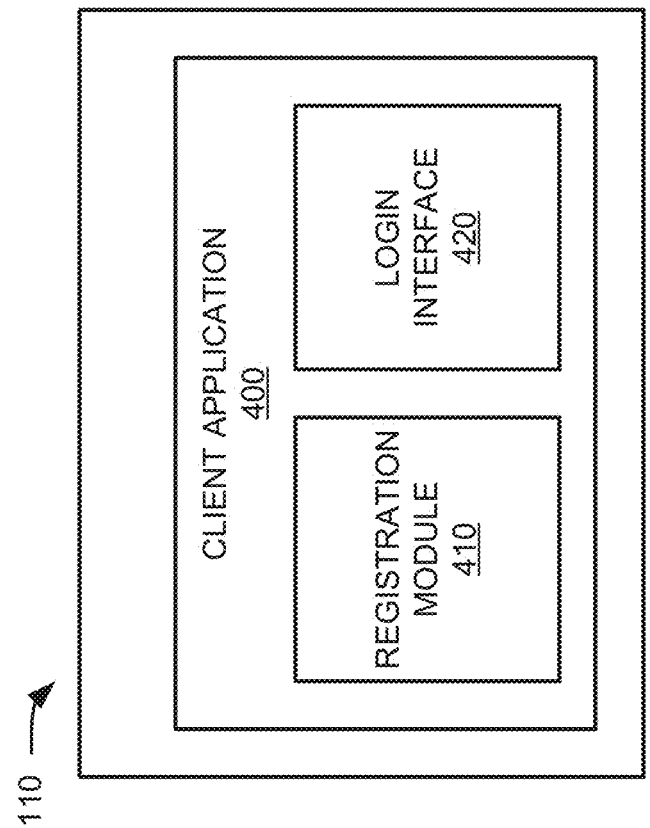

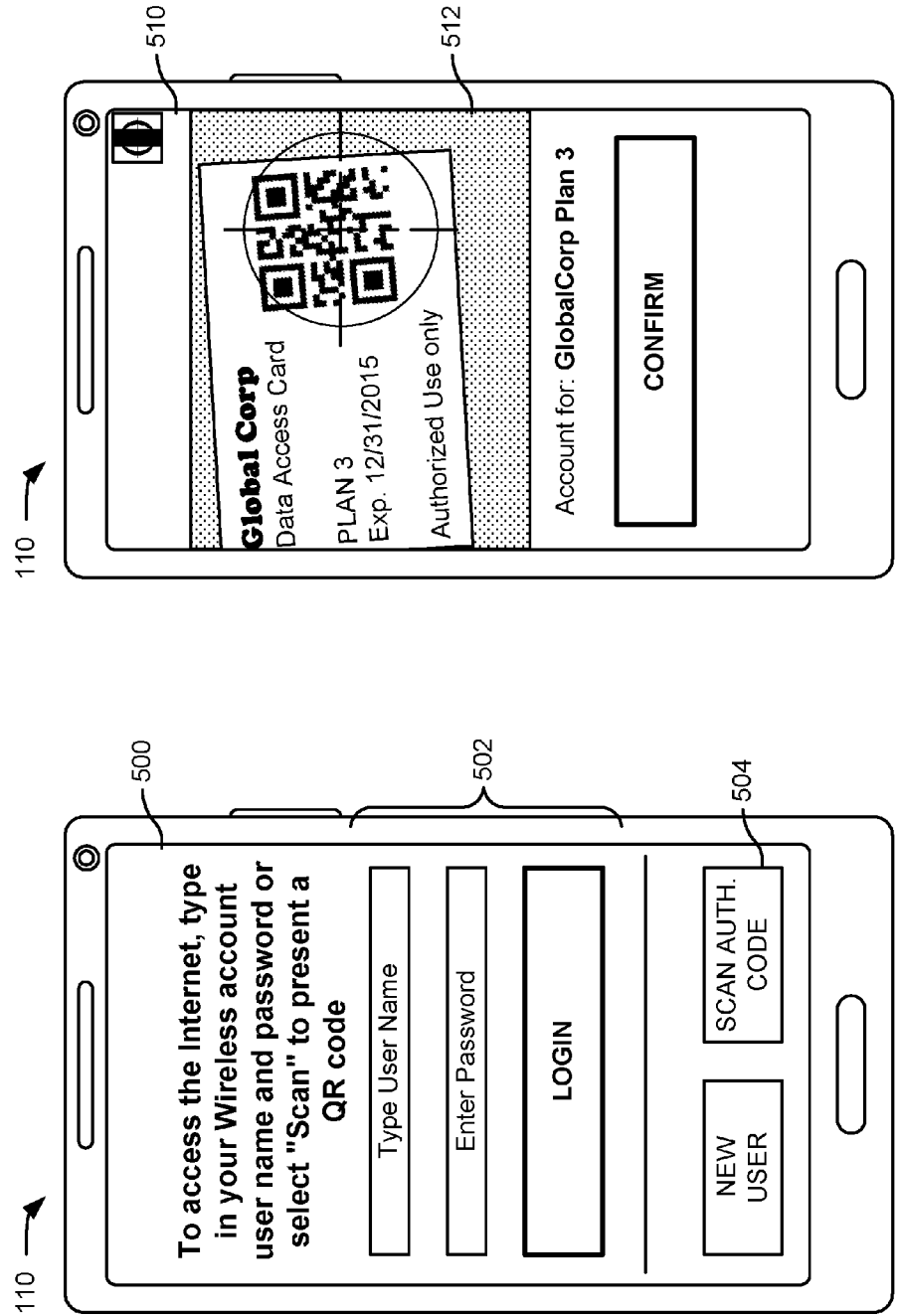

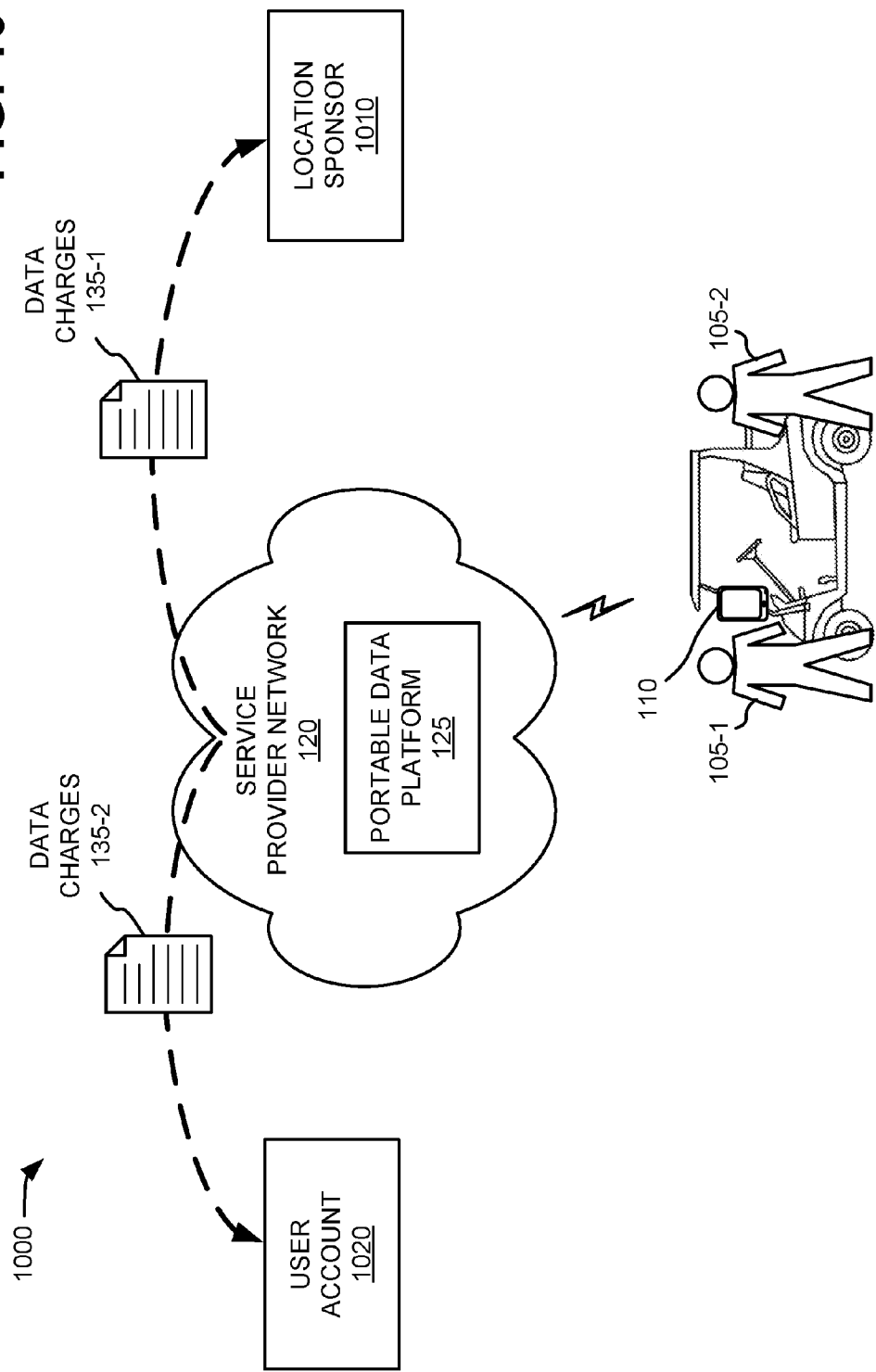

PORTABLE DATA FOR MOBILE DEVICES

CROSS-REFERENCE TO RELATED APPLICATIONS

This application is a continuation of U.S. patent application Ser. No. 14/918,936, filed on Oct. 21, 2015, the disclosure of which is hereby incorporated herein by reference in its entirety.

BACKGROUND

Wireless data plans allow mobile subscribers to access data (e.g., content, applications, etc.) through mobile devices. Data usage for a particular mobile device is typically charged to an account associated with the mobile subscriber who owns/leases the mobile device. The subscriber account may have a periodic limit on total data usage, for example on wireless networks (e.g., a 2 Gigabyte per month data plan). Mobile subscribers of networks that have periodic limits for data usage often arrange their data usage behavior to avoid overages associated with exceeding periodic limits on data usage.

BRIEF DESCRIPTION OF THE DRAWINGS

FIG. 3 is a block diagram of exemplary components of a device that may correspond to one of the devices of FIG. 2;

FIG. 4 is a block diagram of exemplary functional components of the mobile device of FIG. 1;

FIGS. 5A-5C are diagrams illustrating exemplary user interfaces for the mobile device of FIG. 1;

FIGS. 8-10 provide illustrations of use cases for a portable data service according to implementations described herein.

DETAILED DESCRIPTION OF PREFERRED EMBODIMENTS

The following detailed description refers to the accompanying drawings. The same reference numbers in different drawings may identify the same or similar elements.

According to an implementation described herein, systems and/or methods may register a mobile device to use mobile data with a service provider network and create a default account for the mobile device. The systems and/or methods may receive, via the mobile device, user credentials to activate a portable data service for the mobile device, and may determine that the user credentials correspond to an existing account that is different than the default account for the mobile device. The systems and/or methods may assign, to the existing account, a temporary mobile directory number (MDN); may map the temporary MDN to a unique identifier for the mobile device; and may log mobile data use, by the mobile device, using the temporary MDN. The systems and/or methods may detect a signal to deactivate the portable data service for the mobile device; and may create a billing record, which is charged to the existing account, based on the logging.

In conventional data plans for mobile devices, data use on a mobile device is locked to one account. According to implementations described herein, portable data may allow users to access their own mobile data allotment via any mobile device that is registered with the same service provider network. Thus, use of data on a mobile device may be associated with any one of multiple subscriber accounts.

Figure 1:
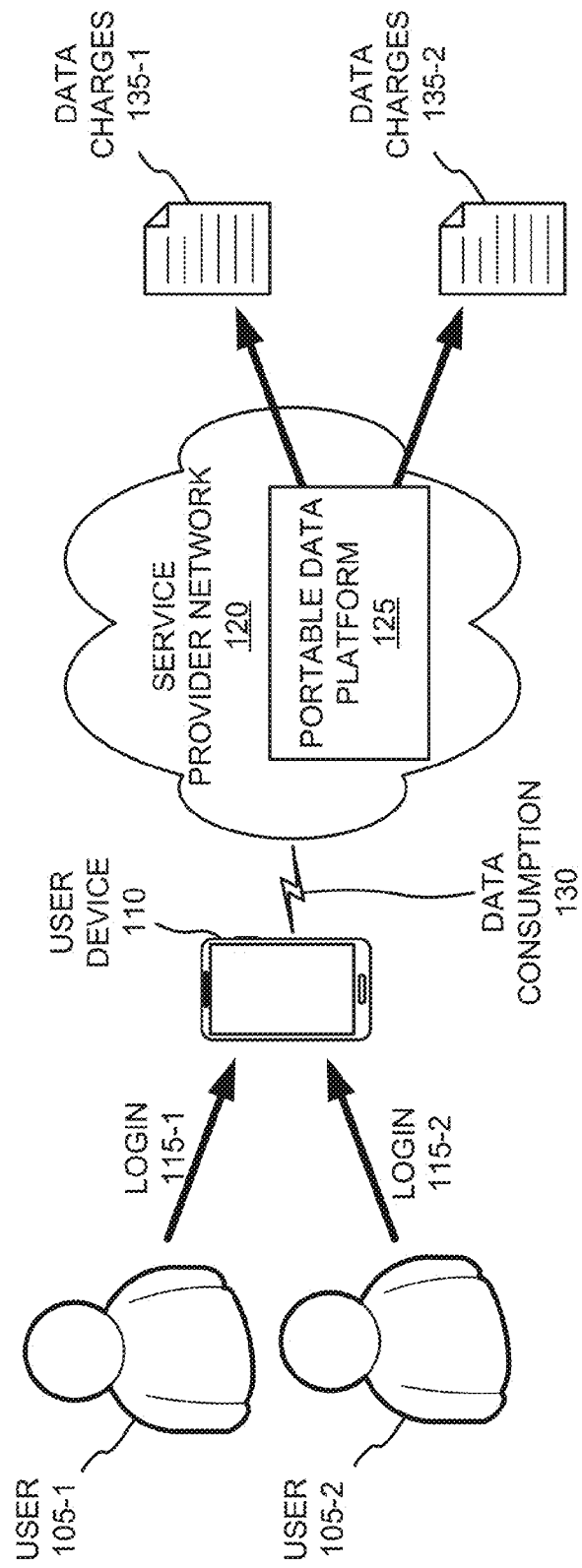
FIG. 1 is a diagram illustrating an implementation for using portable data described herein.

FIG. 1 is a diagram illustrating portable data for mobile devices according to an implementation described herein. As shown in FIG. 1, multiple users 105-1 and 105-2 (collectively "users 105" and generically "user 105") may access mobile data via network 120 using the same mobile device 110 at different times. At the start of a user's session on mobile device 110, each user 105 may be guided to access an application, homescreen, or webpage on mobile device 110 to login with user credentials (such as a unique username and password), as indicated by references 115-1 and 115-2. In some instances, the user credentials may be associated with a single sign-on process for multiple services offered through service provider network 120. Service provider network 120 may receive the login information, and a portable data platform 125 within network 120 may associate the data consumption 130 (also referred to herein as "mobile data") from the user's session with a user's personal data plan. Portable data platform 125 may log data consumption 130 and assign data charges 135-1 and 135-2 to respective data plan accounts for each user 105. In one implementation, data charges 135 may be assigned to a user's existing subscription (e.g., a monthly data plan associated with a different mobile device or group of mobile devices). In another implementation, one or more of data charges 135 may be assigned to a group data plan, such as a corporate data plan, that is not assigned to any particular mobile device but that can be accessed from any mobile device.

Figure 2:
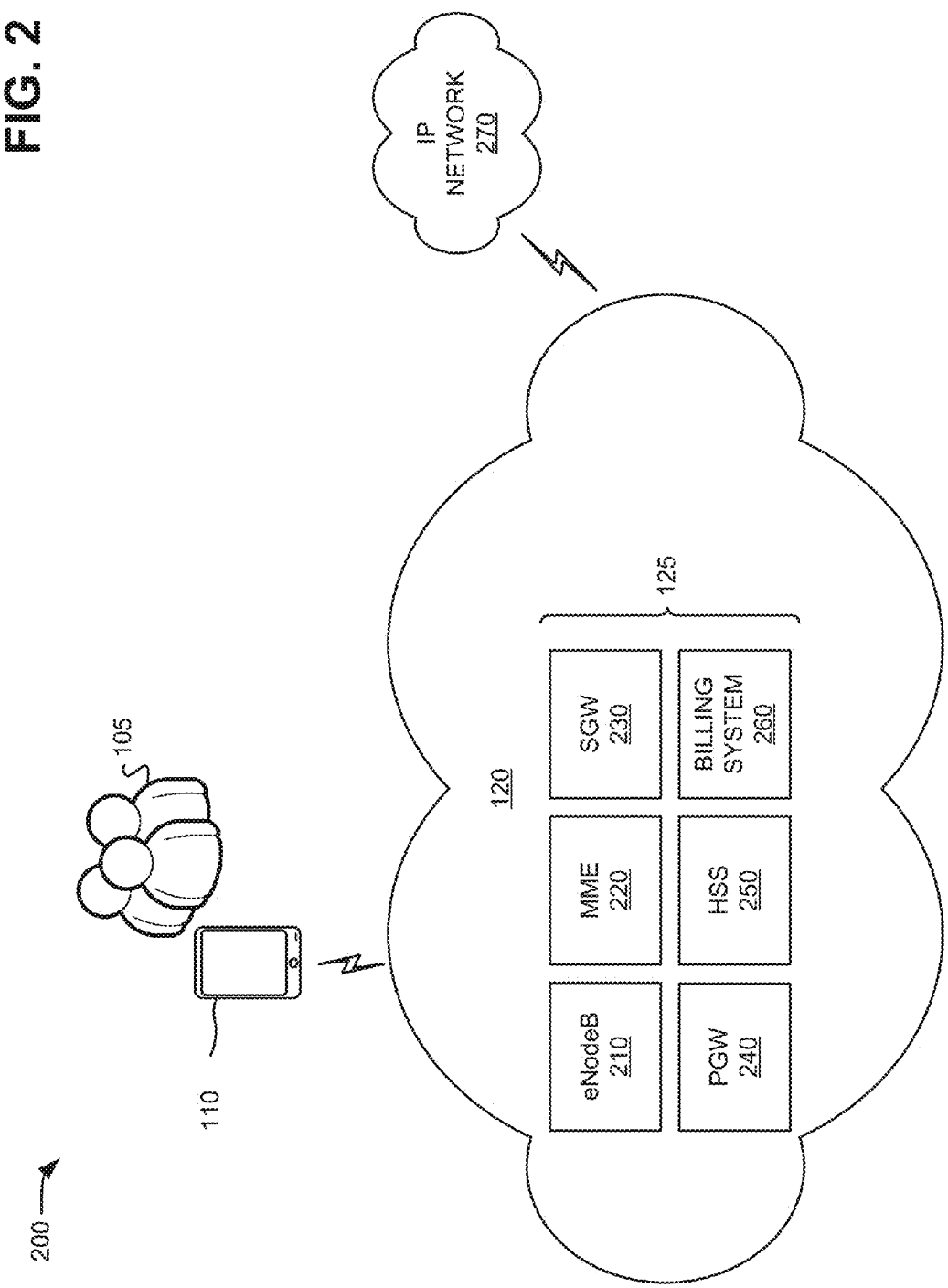
FIG. 2 is a diagram that illustrates an exemplary network environment in which systems and/or methods described herein may be implemented.

FIG. 2 is an exemplary network environment 200 in which systems and/or methods described herein may be implemented. As illustrated, network environment 200 may include users 105; mobile device 110; service provider network 120 including an eNodeB 210, a mobility management entity (MME) device 220, a serving gateway (SGW) device 230, a packet data network gateway (PGW) device 240, a home subscriber server (HSS) device 250, and a billing system device 260; and one or more IP network 270. Portable data platform 125 may be implemented, for example, as a distributed component among eNodeB 210, MME 220, SGW 230, PGW 240, HSS 250, and billing system 260. The number of devices and networks included in FIG. 2 are for illustrative purposes.

Users 105 may be users of mobile devices 110. In one implementation, users 105 may include subscribers of services provided by service provider network 120, such as subscribers of wireless data plans. In another implementation, users 105 may not be subscribers of service provider network 120, such a user seeking temporary access to services from service provider network 120.

Mobile device 110 may include any type of device that is able to transmit and receive data, such as text data, video data, image data, audio data, multi-media data, etc., over a cellular network. For example, mobile device 110 may include a mobile terminal (e.g., a smart phone, smart watch, or the like), some type of computer (e.g., as a personal computer (PC), a tablet computer, a laptop computer, a wearable computer, etc.), a personal digital assistant (PDA), a web-based appliance, etc. Mobile devices 110 may also include a telephone, such as an Internet-protocol (IP) based phone, a wireless telephone, a vehicular infotainment system that includes telephone capabilities, etc., used to make and receive telephone calls. Mobile device 110 may be a subscriber to mobile telephony services and/or mobile data services provided in association with service provider network 120. Mobile data services may include any activity that consumes data over a cellular broadband network and may be implemented, for example, in conjunction with or as a consequence of, mobile device 110 sending or receiving data from accessing websites, applications, etc.

Each mobile device 110 may be dynamically associated with one or more particular customer accounts of the service provider that operates network 120. Each mobile device 110 may be initially registered with service provider network 120, associated with a default account. According to an implementation described herein, mobile device 110 may be equipped with a client application that allows user 105 to assign mobile data charges pertaining to a particular user session to a different account than the default account. A "user session" (also referred to herein as a "portable data session") may include a continuous period of mobile device 110 use in which mobile data is charged to a particular user account.

Service provider network 120 (or simply "network 120") may include one or more wired, wireless and/or optical networks that are capable of receiving and transmitting data, voice and/or video signals, including multi-media signals that may include voice, data and video information. For example, network 120 may include one or more access networks, IP multimedia subsystem (IMS) networks, evolved packet core (EPC) networks, or other networks. The access network may include one or more wireless networks and may include a number of transmission towers for receiving wireless signals and forwarding the wireless signals toward the intended destinations. The access network may include a wireless communications network that connects subscribers (e.g., mobile devices 110) to other portions of service provider network (e.g., the EPC network). In one example, the access network may include a long-term evolution (LTE) network. In other implementations, the access network may employ other cellular broadband network standards such as 3rd Generation Partnership Project (3GPP) 3G, 4G, and future standards. Network 120 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

Service provider network 120 may provide, among other services, access to digital content, such as web pages, downloads, or streaming media available to mobile devices 110. In an exemplary implementation, service provider network 110 may represent a network associated with a service provider that provides various services, such as Internet-protocol (IP) related services, value added services, etc.

Service provider network 120 may monitor data consumption by mobile devices 110 over all or portions of service provider network 120. In some instances, service provider network 120 may manage accounts with limited data quotas over some or all of network 120. For example, a single mobile device 110 may be registered with a mobile data plan that includes a one (1) GB per month limit, with charges incurred by the user for additional data use over the monthly limit. As another example, a group mobile data plan may be accessible by multiple mobile devices 110 and may include a cumulative 100 GB data limit per month, with charges incurred for additional data use over the monthly limit.

Portable data platform 125 may allow users 105 to access their own mobile data allotment, or a shared mobile data allotment, via any mobile device 110 that is registered with service provider network 120. According to implementations described herein, mobile data may be credited toward a user's monthly data plan without accruing data use charges associated with a default account for mobile device 110. Functions of portable data platform 125 are described further in connection with FIG. 6.

ENodeB 210 may include one or more computation and/or communication devices that receive voice and/or data from MME 220 and/or SGW 230 and wirelessly transmit that voice and/or data to mobile device 110. ENodeB 210 may also include one or more devices that wirelessly receive voice and/or data from mobile device 110 and transmit that voice and/or data to one of MME 220 and/or SGW 230 or to other mobile device 110. ENodeB 210 may combine the functionalities of a base station and a radio network controller (RNC) provided in 2G or 3G radio access networks.

MME 220 may include one or more computation and/or communication devices that may be responsible for idle mode tracking and paging procedures (e.g., including retransmissions) for mobile device 110. MME 130 may be involved in a bearer activation/deactivation process (e.g., for mobile device 110) and may choose a SGW (e.g., SGW 230) for wireless terminal 110 at an initial attach and at a time of intra-LTE handover. MME 220 may provide a control plane function for mobility between access networks.

SGW 230 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 230 may route and forward user data packets, may act as a mobility anchor for a user plane during inter-eNodeB handovers, and may act as an anchor for mobility between LTE and other 3GPP (3rd Generation Partnership Project) technologies. SGW 230 may include a local resource timer to manage network resources. SGW 230 may manage and store contexts associated with wireless terminal 110 (e.g., parameters of an IP bearer service, network internal routing information, etc.).

PGW 240 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 240 may provide connectivity of mobile device 110 to external PDNs (e.g., in IP network 270) by being a traffic exit/entry point for mobile device 110. Mobile device 110 may simultaneously connect to more than one PGW 240 for accessing multiple PDNs. PGW 240 may perform policy enforcement, packet filtering for each user, charging support, lawful intercept, and packet screening. PGW 240 may also act as an anchor for mobility between 3GPP and non-3GPP technologies.

HSS 250 may include one or more devices that function as a HSS for an access network of network 120 and/or that act as an authentication, authorization and accounting (AAA) server for an access network of network 120. For example, HSS 250 may store information associated with a subscriber, services that the subscriber has requested or been assigned and settings (e.g., mobile data allotments, quality of service, service priority, authorized service category, admission control level for authorized service category, charging and policy rules, etc.) associated with the services, and/or a current location of the user 105. Furthermore, HSS 250 may verify a subscriber's identity, authenticate and/or authorize mobile device 110 using a device identification number (e.g., by performing IMSI or MAC authentication), authorize a particular service, and/or track consumption of network resources for a particular user 105. HSS 250 may provide to MME 220 the user information, including the authorized services service categories, and/or admission control level, during a device authentication and authorization process when mobile device 110 requests initial network attachment. In one implementation, HSS 250 may interface with mobile device 110, SGW 230, PGW 240, and/or billing system 260 to assign mobile data charges for mobile device 110 to a particular account.

Billing system 260 may include one or more computing devices to manage charging users 105 for mobile data services provided via network 120. Billing system 260 may perform credit card checks (e.g., for new subscriptions and/or trial subscriptions, etc.), assign charges to subscriber accounts, and/or process payments for subscriptions or purchases with network 120. For existing subscribers, billing system 260 may also request and receive payments from the external billing entity (e.g., for monthly subscription fees, etc. associated with an account).

IP network 270 may include one or more networks (e.g., a local area network (LAN), a wide area network (WAN), a metropolitan area network (MAN), an IP Multimedia Subsystem (IMS) network, the Internet, private or public wireless or landline network, etc.) capable of communicating with mobile device 110. Mobile device 110 may communicate to another mobile device 110 via IP network 270 as well as an application or a server that resides inside or outside of IP network 270 to send/receive data from mobile device 110.

In FIG. 2, the particular arrangement and number of components of network environment 200 are illustrated for simplicity. In practice, there may be more components and devices. For example, there may be thousands of users 105 and mobile devices 110.

FIG. 3 is a diagram of exemplary components of a device 300. Each of mobile device 110, eNodeB 210, MME 220, SGW 230, PGW 240, HSS 250, and billing system 260 may be implemented/installed as software, hardware, or a combination of hardware and software, on its respective device 300. In one implementation, device 300 may be configured as a network device that communicates over a network via communication interface 360. In another implementation, device 300 may be configured as a personal computing or communication device. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a remote control, one or more biometric mechanisms, and the like. Output device 350 may include a device that outputs information to the operator, such as a display, a speaker, etc. Input device 340 and output device 350 may, in some implementations, be implemented as a user interface (UI) that displays UI information and which receives user input via the UI.

Communication interface 360 may include a transceiver that enables device 300 to communicate with other devices and/or systems. For example, communication interface 360 may include mechanisms for communicating with other devices, such as other devices in network environment 200. Each of such other devices of network environment 200 may include its respective communication interface 360 to achieve such communication.

As described herein, device 300 may perform certain operations in response to processor 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. Alternatively, or additionally, one or more components of device 300 may perform one or more other tasks described as being performed by one or more other components of device 300.

FIG. 4 is a block diagram of exemplary functional components of mobile device 110. The functions described in connection with FIG. 4 may be performed by one or more components of device 300 (FIG. 3). As shown in FIG. 4, mobile device 110 may include a client application 400 with a registration module 410 and a login interface 420.

Client application 400 may include hardware and software components. The software components may be downloaded, for example, from an application server when mobile device 110 contacts network 120 to register for portable data service. In other implementations, client application 400 may be provided as part of a webpage, a browser, an operating system, or operating system update.

Registration module 410 may register mobile device 110 for access to portable data services offered by service provider network 120 (e.g., services to log, assign, and charge mobile data among different users 105 of mobile device 110). For example, registration module 410 may provide a user interface to enable an owner (e.g., one of users 105 or another entity) of mobile device 110 to authorize an International Mobile Equipment Identity (IMEI) of mobile device 110 to be associated with portable data requests. Registration module 410 may solicit user credentials (e.g., a client ID and password) for the owner's wireless network account. In one aspect, registration module 410 may also solicit an owner's email or messaging address to facilitate off-line notifications. Upon receipt of the owner's credentials, registration module 410 may activate client application 400 to promote portable data services.

Login interface 420 may include an interactive client interface that allows a user 105 to provide account credentials, such as a username/password combination or an authentication certificate, for an account associated with service provider network 120. The account may include, for example, a user's wireless account (e.g., with a monthly mobile data allotment) or a group account, such as a corporate mobile data account that can be shared among employees. Upon receiving user credentials, client application 400 may forward the user credentials to service provider network 120 (e.g., portable data platform 125) for authentication and authorization.

Although FIG. 4 shows exemplary functional components of mobile device 110, in other implementations, mobile device 110 may include fewer components, different components, or additional components than those depicted in FIG. 4.

Figure 5C:
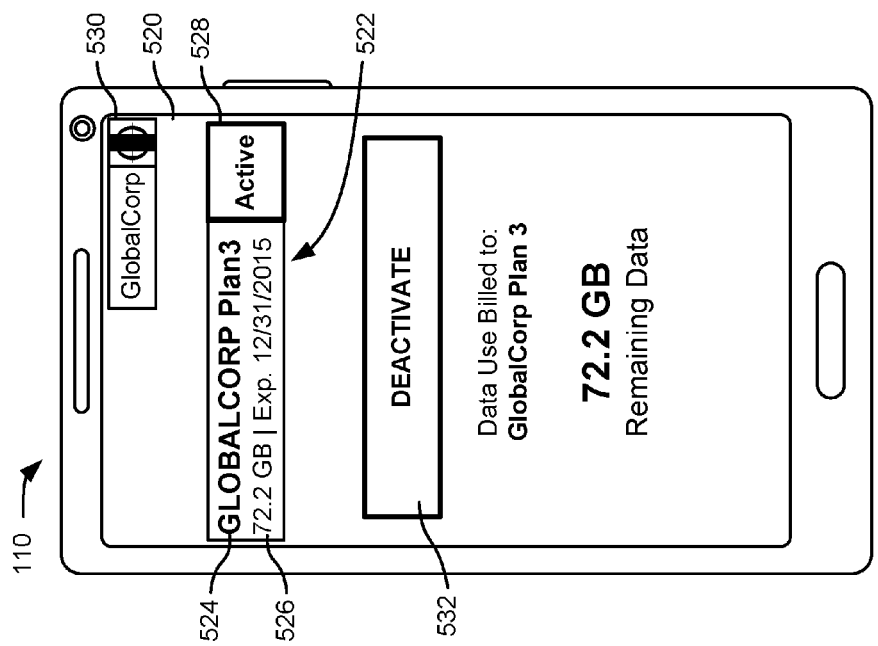

FIGS. 5A-5C illustrate an exemplary user interface that may be presented by login interface 420 on a screen of mobile device 110. As shown in FIG. 5A, a login screen 500 may be presented on mobile device 110 to user 105. Login screen 500 may include login prompt section 502 to solicit a username and password for a user account (e.g., an account with a service provider to which mobile data use can be billed). Alternatively, login screen 500 may include a button 504 to initiate a QR code or barcode scan. For example, user 105 may select button 504 that may activate a camera/scanning application of mobile device 110 to read a QR code and may present screen 510 of FIG. 5B.

Referring to FIG. 5B, screen 510 may include an image window 512 to permit user 105 to scan the QR code, such as a QR code on a data card. The QR code may provide access to a particular portable data plan, such as a corporate data plan for employees. Mobile device 110 may identify the QR code presented (by user 105) in front of the camera of mobile device 110.

Client application 400 may forward the user credentials (e.g., the username/password combination and/or QR code scan results) to one of the devices in portable data platform 125. Assuming the user credentials are approved by portable data platform 125 for access to a particular data plan, login interface 420 may present screen 520 of FIG. 5C. As shown in FIG. 5C, screen 520 may provide a plan description window 522. Plan description window 522 may include a plan identifier field 524, an available data amount field 526, and a status field 528. Plan identifier field 524 may include a name or unique identifier for a data plan (e.g., "GlobalCorp Plan3"). Available data amount field 526 may include the amount of data available for the current periodic interval (e.g., "72.2 GB"). Status field 528 may include the status of the data plan in relation to mobile device 110 (e.g., "Active"). A status icon 530 may indicate that a portable data session is active and may indicate the party/account to which data is currently being charged. Status icon 530 may remain visible on the display (e.g., in an information header section) of mobile device 110 when user 105 navigates to another page or application. A deactivate button 532 may include a virtual button accept user input to expressly terminate a portable data session. In another implementation, deactivate button 532 may be presented at any time during a portable data session via selecting status icon 530.

Figure 6:
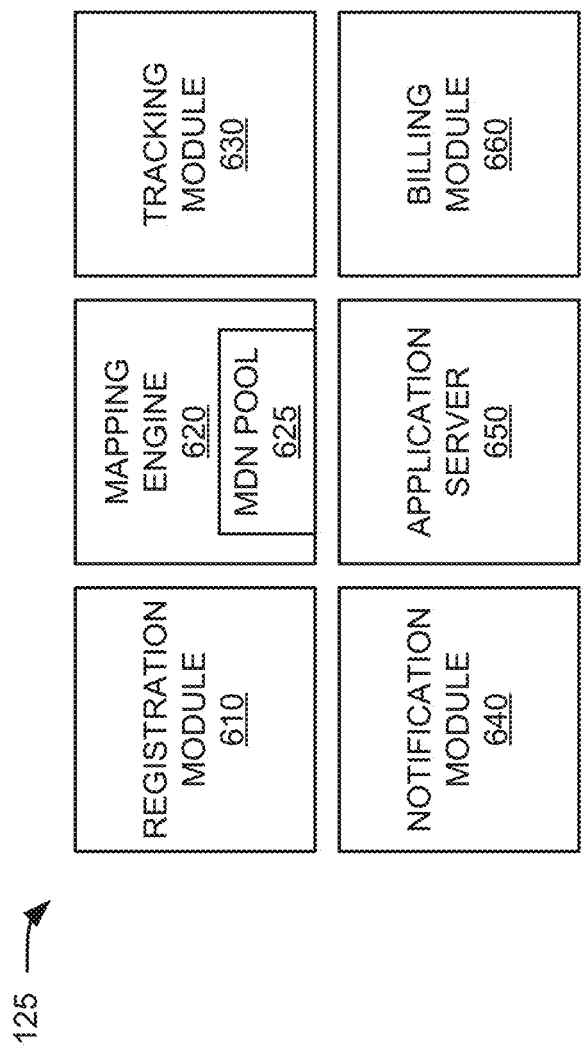
FIG. 6 is a block diagram of exemplary functional components of the portable data platform of FIG. 1.

FIG. 6 is a block diagram of exemplary functional components of portable data platform 125. The functions described in connections with FIG. 6 may be performed by one or more components of device 300 (FIG. 3) or multiple devices 300 (e.g., eNodeB 210, MME 220, SGW 230, PGW 240, HSS 250, and billing system 260) distributed within network 120. As shown in FIG. 6, portable data platform 125 may include a registration module 610, a mapping engine 620, a tracking module 630, a notification module 640, an application server 650, and a billing module 660.

In one implementation, registration module 610 allows owners of mobile devices 110 or other subscribers to register a particular mobile device 110 for use with portable data. For example, registration module 610 may provide a secure web site or be accessed through other user account settings to configure and authorize use of portable data on a particular mobile device 110. In one implementation, registration module 610 may permit/cause mobile device 110 to download client application 400.

In another implementation, registration module 610 may allow subscribers to create mobile data accounts for access by other users 105. Registration module 610 may register an account with a periodic data limit (e.g., 10 GB per month, 100 GB per month, etc.), which is designated to be accessible to particulars user or a particular group of users. In one implementation, registration module 610 may be accessed as part of a wireless services portal where a subscriber (e.g., a representative of a corporate entity) may create an account (or modify an existing account with the service provider), register particular users or access credentials, set periodic (e.g., monthly) data amounts, and define access parameters (e.g., to limit data use for individual users, add filters, block particular content, etc.). In one implementation, a user may create a shared data account for a limited period and define a duration of availability for the account, identify types of data to be accessible through the account, limit an amount of data that can be used by any single mobile device 110, define locations (e.g., cell towers, regions, etc.) where the mobile data can be used, and/or limit bandwidth per mobile device 110 using the shared data account.

Mapping engine 620 may include a pool 625 of temporary MDNs (or another unique identifier) that may be used to log data use for portable data sessions. In one implementation, mapping engine 620 and MDN pool 625 may be incorporated within HSS 250. Mapping engine 620 may assign a temporary MDN for a portable data session and associate the MDN with a subscriber's mobile data account, a shared data account, or direct payment account. Mapping engine 620 may further associate the temporary MDN with the IMEI of the mobile device 110 that is using portable data (e.g., using a wireless data plan that is not the default plan of the particular mobile device 110). When a portable data session is over, mapping engine 620 may release the temporary MDN back into MDN pool 625 for future use.

Tracking module 630 may monitor data consumption for particular portable data sessions. For example, tracking module 630 may log data use for a particular portable data session using data packet time stamps for a data flow to/from mobile device 110 (e.g., as indicated by the temporary MDN). In one implementation, tracking module 630 may perform packet header inspections to associate data with a particular portable data account. Tracking module 630 may receive instructions and/or information from registration module 610 indicating an account (e.g., associated with a user 105 or group account) to which charges for data consumed on mobile device 110 are to be applied during a particular time period. In one implementation, tracking module 630 may associate data consumption retroactively from the time of a session login for a portable data user. For example, data use for an initial request from client application 400 (e.g., login interface 420) to access a portable data account may be retroactively charged to the user's portable data account. Data consumption on mobile device 110 may continue to be charged to the same portable data account until the portable data session is deactivated (e.g., due to selection of button 532 to end the portable data session, a time limit for the portable data session, a data consumption limit of the portable data session, etc.).

In one implementation, tracking module 630 may insert a unique user identifier (e.g., a temporary MDN) into TCP/IP packets to represent the mobile identity of a mobile user associated with mobile device 110. In some implementations, the user identifier may be inserted into an existing packet header or included in a new packet header. The user identifier may be used, for example, to log data consumption by individual users on mobile device 110.

Notification module 640 may provides notifications to mobile device 110 to enable a user to identify an active account for data use charges on mobile device 110. The notifications from notification module 640 may be provided to mobile device 110 and presented, for example, as on-screen indications of particular account usage on mobile device 110. Notifications may include, for example, information that may be presented as status icon 530 or a widget on mobile device 110. Other notifications formats, such as color codes or audible tones on mobile device 110, may also be used.

Application server 650 may provide a backend support system for mobile applications residing on mobile devices 110. For example, application server 650 may perform authentication processes for user 105 and client application 400. Application server 650 may prompt mobile device 110 or user 105 to provide credentials when accessing portable data platform 125. Application server 650 may also provide server authentication tokens when required in communicating with other platforms. Application server 650 may permit mobile device 110 to download client application 400 to permit other users to use portable data on mobile device 110. In one implementation, the interactions between application server 650 and mobile device 110 may be performed using hypertext transfer protocol (HTTP) or secure HTTP (HTTPS).

Billing module 660 may provide billing services for charging portable data use to a user account, a shared corporate (or group) account, or a direct payment that is mapped to the temporary MDN by mapping engine 625. Direct payments may include, for example, a credit card payment or an online payment account (e.g., a PayPal account). In one implementation, some services of billing module 660 may be performed by servers external to network 120 (e.g., billing servers for a partner entity or third party entity) or other conventional billing systems (e.g., on-line charging system (OCS), off-line charging system (OFCS), etc.). Billing module 660 may receive data usage information from tracking module 630 and subsequently bill the portable data use based on, for example, a predetermined arrangement between user 105 and service provider network 120. The predetermined arrangement may include, for example, a fixed fee for a block of data, crediting the portable data use against an existing account, etc.

Although FIG. 6 shows exemplary functional components of portable data platform 125, in other implementations, portable data platform 125 may include fewer components, different components, or additional components than those depicted in FIG. 6.

Figure 7:
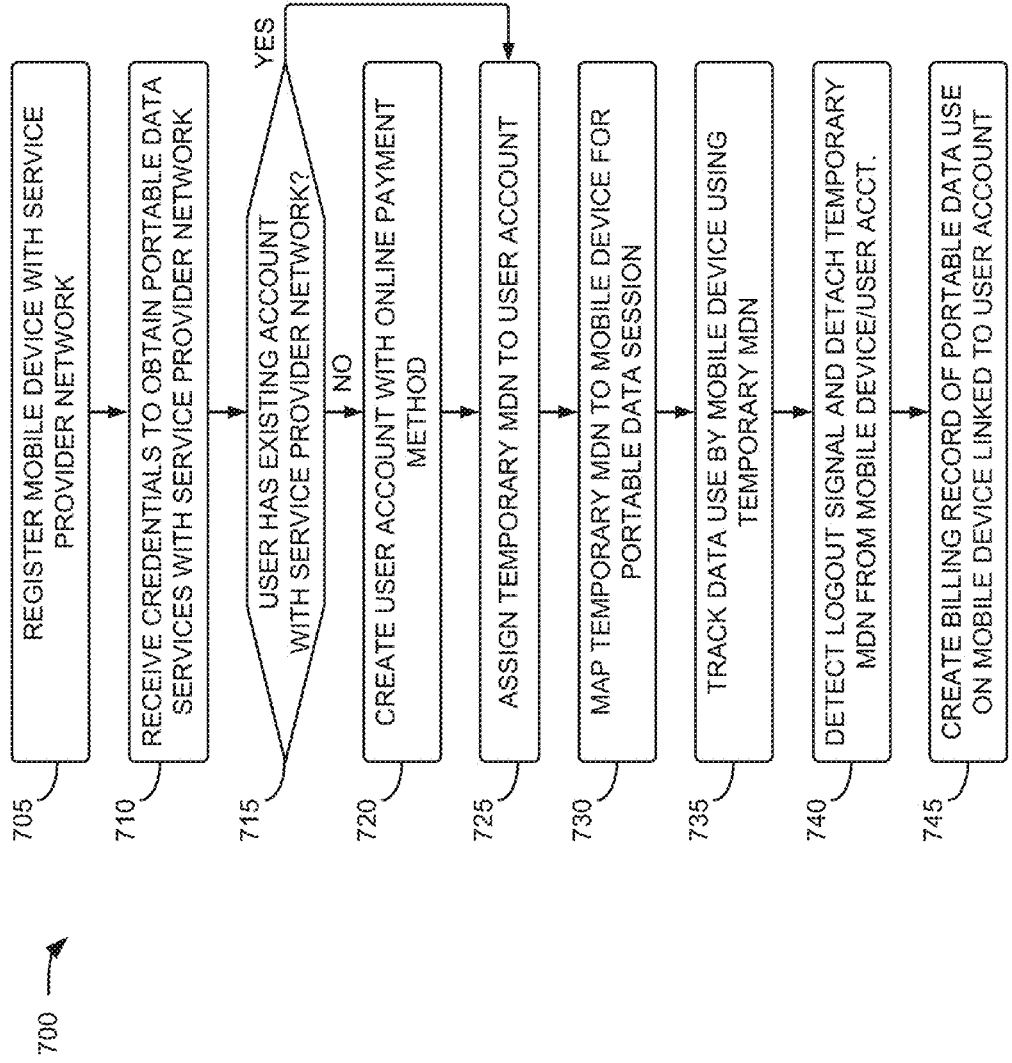
FIG. 7 is a flow diagram of an exemplary process for using portable data according to an implementation described herein.

FIG. 7 is a flow diagram of an exemplary process 700 for using portable data. In one implementation, process 700 may be performed by one or more devices from service provider network 120. In another implementation, process 700 may be performed by one or more devices from service provider network 120 in conjunction with mobile device 110 (e.g., executing client application 400).

Process 700 may include registering a mobile device with a service provider network (block 705) and receiving credentials to obtain portable data services with the service provider network (block 710). For example, mobile device 110 may be purchased/leased by an individual and registered for use of mobile data services with a particular service provider network (e.g., service provider network 120). Mobile device 110 may be configured to access a login option for use of portable data services. The login option may be part of a native experience of the mobile device (e.g., requiring a login at startup, wake-up, or whenever mobile device 110 initiates a mobile data session), may be included in a client application, or may be accessed when opening a browser. Using one of the login options, a user 105 may submit credentials to service provider network 120 as one of an existing subscriber with service provider network 120, a group/corporate data account user, or a new user.

Process 700 may also include determining if a user has an existing account with the service provider network (block 715). For example, based on user login information, service provider network 120 may determine if the user credentials indicate an existing account with service provider network 120. An existing account may include an account that is already registered in the service provider network 120 to which data use may be charged. An existing account may include, for example, a mobile data account associated with another mobile device 110, another type of service account (e.g., internet, television services, a landline phone service, etc.), or a group/corporate data account with service provider network 120.

If the user does not have an existing account with the service provider network (block 715—No), process 700 may include creating a user account with an online payment method (block 720). For example, service provider network 120 may create a user account for a new user and request billing information, such as a credit card number or PayPal account. In creating the user account, service provider network 120 may identify billing rates (e.g., an amount per GB or portions thereof) for mobile data use on mobile device 110.

After creating a new user account (block 720) or if the user has an existing account with the service provider network (block 715—Yes), process 700 may include assigning a temporary MDN to the user account (block 725), mapping the temporary MDN to the mobile device for the portable data session (block 730), and tracking data use by the mobile device using the temporary MDN (block 735). For example, service provider network 120 may select an available MDN from a pool of temporary MDNs to associate with the new or existing account. Service provider network 120 may also map a mobile device identifier, such as an IMEI of mobile device 110, to the temporary MDN used for the portable data session. Service provider network 120 (e.g., tracking module 630) may log data use for a particular portable data session using data packet time stamps for a data flow to/from mobile device 110 (e.g., as indicated by the temporary MDN).

Process 700 may further include detecting a logout signal and detaching the temporary MDN from the mobile device and user account (block 740), and creating a billing record of portable data use on the mobile device linked to the user account (block 745). For example, service provider network 120 may receive a logout signal indicating an end of a portable data session. The logout signal may include, for example, an indication from a user of mobile device 110 (e.g., selecting deactivate button 532 of FIG. 5), an expiration time signal from a device within portable data platform 125, or a data limit signal from a device within portable data platform 125. Portable data platform 125 may reassign the temporary MDN to MDN pool 625 for future use in another portable data session (e.g., with the same or another mobile device 110). Based on the tracked data use, portable data platform 125 may generate a billing event, which may be charged to the user account, the group/corporate account, or the online payment account of the user (e.g., as indicated in the new account or existing account from block 725).

Figure 8:
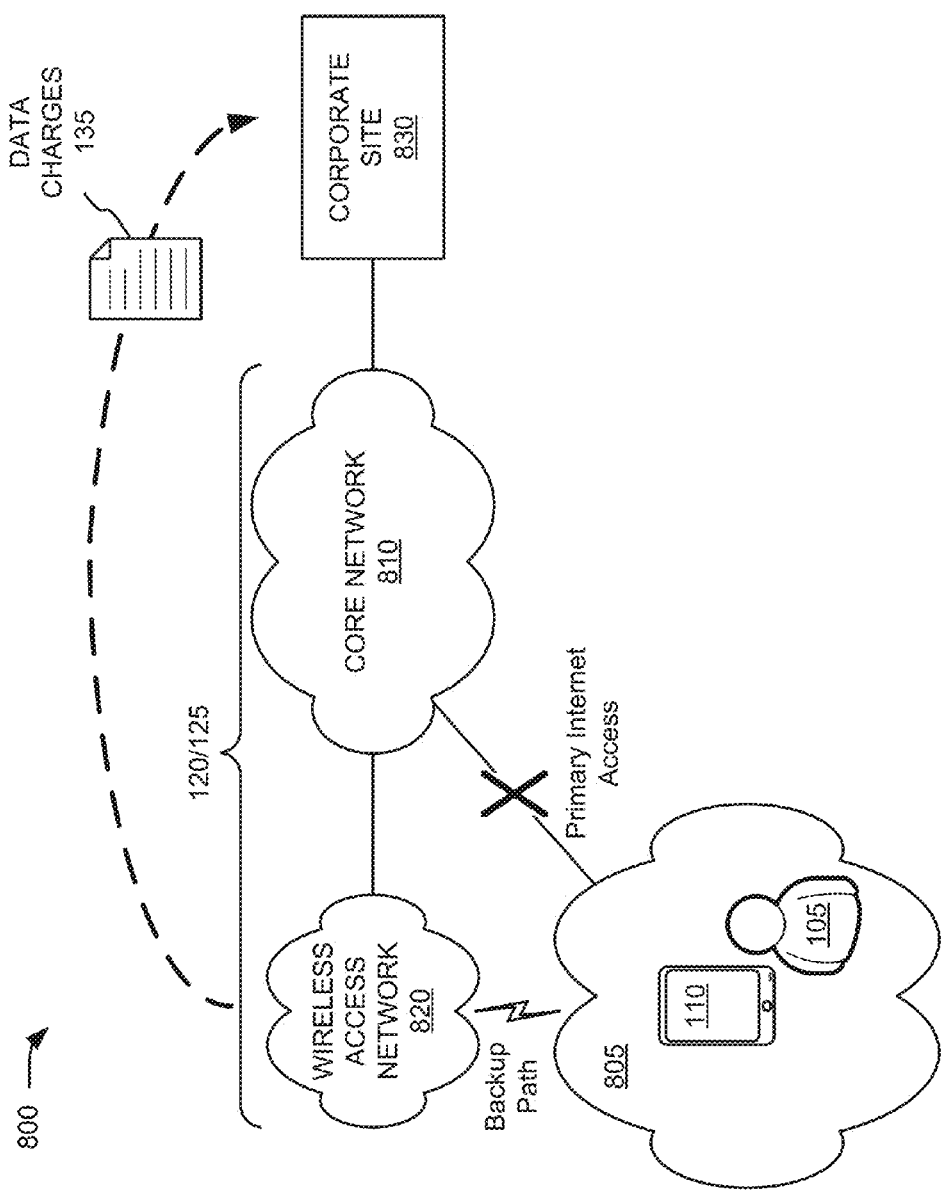

FIG. 8 illustrates a use case for portable data according to an implementation. In the example of FIG. 8, a portable data service may provide a backup to primary internet access channels for employees. As shown in FIG. 8, a user 105 (e.g., an employee of a Corporation) uses mobile device 110 from a home network 805, which is connected to a core network 810. Home network 805 may provide mobile device 110 with primary internet access to a corporate site 830. The Corporation subscribes to a pooled corporate data plan with service provider network 120, as described previously herein. In the event of an internet outage from home network 805, user 105 may use mobile device 110 to get backup access to corporate site 830 without consuming data from his/her personal data plan. For example, user 105 may login to portable data platform 125 via client application 400, providing credentials consistent with the pooled corporate data plan. Portable data platform 125 may bill data use by mobile device 110, over the wireless backup path, to corporate site 830 as data charges 135.

Figure 9:
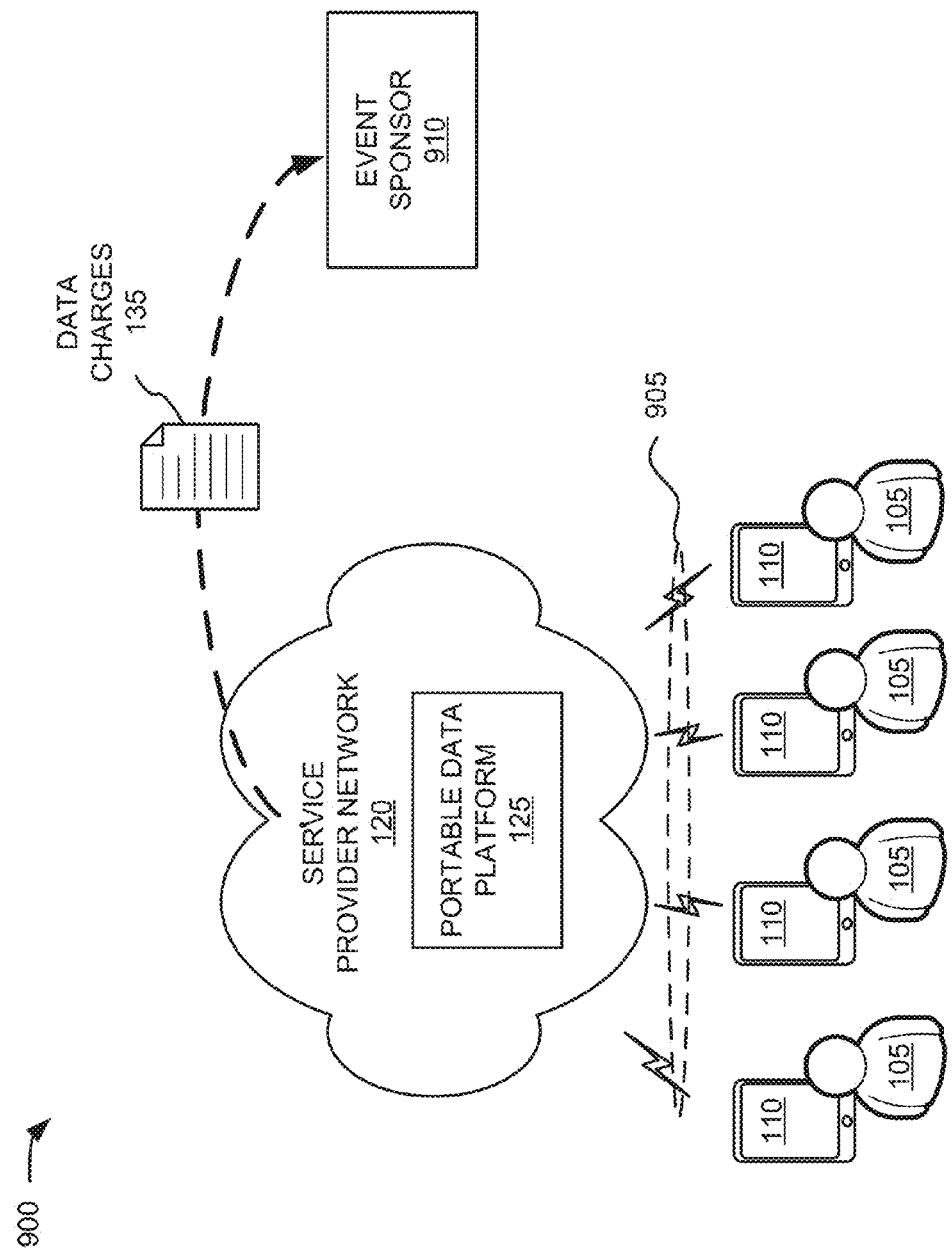

FIG. 9 illustrates a use case for portable data according to another implementation. In the example of FIG. 9, a portable data service may provide an alternate wireless data channel for an event. Using a user's own mobile device, the billing of data usage may be switched to a promotional account for a finite period of time to consume data without charging data use costs to the user's account. As shown in FIG. 9, users 105 may gather at an event, such as a picnic or retreat which provides no Wi-Fi service. An event sponsor 910 may subscribe to a pooled event data plan with service provider network 120, that provides LTE data access 905 for a particular limited period, such as the duration of the event. Event sponsor 910 may also set restrictions (e.g., restrictions enforced by service provider network 120) on the types of data, amounts of data per mobile device 110, locations (e.g., particular service cells/towers), and bandwidth per mobile device 110 under the pooled event data plan. For example, users 105 may login to portable data platform 125 via client applications 400 on their respective mobile device 110, providing credentials for access to the pooled event data plan. Mobile devices 110 that have been registered for service with service provider network 120 may access network services (e.g., data) in a controlled manner to ensure fair use and consistent user experience among mobile devices 110. Portable data platform 125 may bill data use by mobile devices 110, over LTE data access 905, to event sponsor 910 as data charges 135.

FIG. 10 illustrates a use case for portable data according to still another implementation. In the example of FIG. 10, a portable data service may be used to provide wireless data from a shared mobile device 110. The shared mobile device 110 may be included in a vehicle (e.g., a car, scooter, golf cart, etc.) or provided with as part of a mobile group event (e.g., scavenger hunt, tour, etc.). In the example of FIG. 10, a golf cart may come equipped with a tablet computer (or another mobile device 110) having LTE access and a custom set of applications that may be related to a golf outing and/or of general interest. Data use can be billed to the golf course's corporate data pool as a default. User access to mobile device 110 may be restricted by requiring data cards (e.g., cards with QR codes or login requirements, as shown in FIGS. 5A and 5B) that can be given or sold to customers at the golf course's discretion. Similar to the example of FIG. 9, data use from the corporate data pool may be restricted according to the sponsor's (e.g., location sponsor 1010) preferences. In the example of FIG. 10, user 105-1 may have a data card provided by the servicing golf course. Conversely, users already having an account with service provider network 120 have the option to login with client application 400 for data access billed to a personal account. In the example of FIG. 10, user 105-2 may have an existing personal account, with service provider network 120, that includes portable data. Data charges 135-1 for data consumed by user 105-1 (e.g., via mobile device 110 using the corporate data pool login) may be charged to location sponsor 1010. Data charges 135-2 for data consumed by user 105-2 (e.g., via mobile device 110 using the user's existing personal account) may be charged to user account 1020. Thus, users 105 may have the option of wireless access in a sponsored location (such as a golf course) regardless of whether the user has an account with service provider network 120.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, although network environment 200 includes a distributed portable data platform 125, according to other embodiments, portable data platform 125 may be combined in one or any combination of devices within network environment 200. An another example, while series of blocks have been described with respect to FIG. 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code-it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method performed by one or more network devices in a service provider network, the method comprising:
    receiving, from an owner of a portable data account with a service provider, configuration settings for the portable data account, the portable data account providing for mobile data over a broadband cellular network, the configuration settings including one or more of: a duration of availability for the portable data account, types of data accessible through the portable data account, an amount of mobile data that can be used by each of different mobile devices under the portable data account, locations where the mobile data can be used, and bandwidth per mobile device through the portable data account;
    receiving, via a mobile device, user credentials, for a user, to activate a portable data service for the mobile device;
    determining that the user credentials correspond to the portable data account, the portable data account being different than a default account associated with the mobile device;
    mapping a temporary mobile directory number (MDN), which is associated with the portable data account, to a unique identifier for the mobile device;
    enforcing the configuration settings for a portable data session, associated with the temporary MDN, for the portable data account;
    logging mobile data, used by the mobile device, for the portable data session; and
    creating a billing record for the portable data session, the billing record being based on the logging and associated with the portable data account.

2. The method of claim 1, wherein assigning the temporary MDN includes:
    selecting the temporary MDN from a pool of available MDNs that are designated for portable data sessions.

3. The method of claim 2, further comprising:
    receiving a signal to terminate the portable data session;
    disassociating the temporary MDN from the existing account and the unique identifier for the mobile device in response to receiving the signal; and
    returning the temporary MDN to the pool of available MDNs after the disassociating.

4. The method of claim 3, wherein the signal to terminate the portable data session includes:
    a signal based on user input to end the portable data session,
    a signal of a time limit for the portable data session, or
    a signal of a data consumption limit for the portable data session.

5. The method of claim 1, wherein receiving configuration settings for the portable data account further includes:
    receiving a selection for a mobile data limit of a periodic interval.

6. The method of claim 1, wherein receiving configuration settings for the portable data account further includes:
    receiving a selection for a mobile data limit during a finite time period.

7. The method of claim 1, wherein the mobile data includes data transferred over a broadband cellular network.

8. The method of claim 1, further comprising:
    providing, to the mobile device, a client application that solicits the user credentials and forwards the user credentials to the one or more network devices.

9. The method of claim 1, further comprising:
    providing, to another mobile device, access to a registration module that receives the configuration settings.

10. One or more network devices, comprising:
    a memory for storing instructions to be executed by one or more processors; and
    the one or more processors configured to execute the instructions to:
        receive, from an owner of a portable data account with a service provider, configuration settings for the portable data account, the portable data account providing for mobile data over a broadband cellular network, the configuration settings including one or more of: a duration of availability for the portable data account, types of data accessible through the portable data account, an amount of mobile data that can be used by each of different mobile devices under the portable data account, locations where the mobile data can be used, and bandwidth per mobile device through the portable data account;
        receive, via a mobile device, user credentials, for a user, to activate a portable data service for the mobile device;
        determine that the user credentials correspond to the portable data account, the portable data account being different than a default account associated with the mobile device;
        map a temporary mobile directory number (MDN), which is associated with the portable data account, to a unique identifier for the mobile device;
        enforce the configuration settings for a portable data session, associated with the temporary MDN, for the portable data account;
        log mobile data, used by the mobile device, for the portable data session; and
        create a billing record for the portable data session, the billing record being based on the logging and associated with the portable data account.

11. The one or more network devices of claim 10, wherein the one or more processors are further configured to:
    log additional mobile data, used by the mobile device, through an MDN associated with the default account; and create another billing record for the additional mobile data, the other billing record being based on the logging of the additional mobile data and being associated with the default account.

12. The one or more network devices of claim 10, wherein the one or more processors are further configured to:
receive the user credentials as mobile data transferred over a Long Term Evolution (LTE) network.

13. The one or more network devices of claim 10, wherein the one or more processors are further configured to:
receive a signal to terminate the portable data session;
disassociate, in response to receiving the signal, the temporary MDN from the portable data account and the unique identifier for the mobile device; and
return the temporary MDN to a pool of available MDNs after the disassociating.

14. The one or more network devices of claim 10, wherein the portable data account is a default account for another mobile device.

15. The one or more network devices of claim 10, wherein the portable data account is not a default account assigned to any particular mobile device.

16. The one or more network devices of claim 10, wherein the configuration settings include multiple credentials for the portable data account or multiple mobile devices for the portable data account.

17. A non-transitory computer-readable medium, storing instructions executable by one or more processors, the non-transitory computer-readable medium comprising instructions to:
receive, from an owner of a portable data account with a service provider, configuration settings for the portable data account, the portable data account providing for mobile data over a broadband cellular network, the configuration settings including one or more of: a duration of availability for the portable data account, types of data accessible through the portable data account, an amount of mobile data that can be used by each of different mobile devices under the portable data account, locations where the mobile data can be used, and bandwidth per mobile device through the portable data account;
receive, via a mobile device, user credentials, for a user, to activate a portable data service for the mobile device;
determine that the user credentials correspond to the portable data account, the portable data account being different than a default account associated with the mobile device;
map a temporary mobile directory number (MDN), which is associated with the portable data account, to a unique identifier for the mobile device;
enforce the configuration settings for a portable data session, associated with the temporary MDN, for the portable data account;
log mobile data, used by the mobile device, for the portable data session; and
create a billing record for the portable data session, the billing record being based on the logging and associated with the portable data account.

18. The non-transitory computer-readable medium of claim 17, wherein the instructions to receive the configuration settings include instructions to:
receive configuration settings for multiple designated credentials to access the portable data account, a particular time period to access the portable data account, or particular content accessible through the portable data account.

19. The non-transitory computer-readable medium of claim 17, wherein the unique identifier includes an International Mobile Equipment Identity (IMEI) for the mobile device.

20. The non-transitory computer-readable medium of claim 17, further comprising instructions to:
receive a signal to deactivate the portable data session; and
disassociate, in response to receiving the signal, the temporary MDN from the unique identifier for the mobile device.

* * * * *